US006558775B1

(12) United States Patent
Suzuki

(10) Patent No.: US 6,558,775 B1
(45) Date of Patent: May 6, 2003

(54) PLASTIC SHEET HAVING CREASING LINES AND CREASING LINE-FORMING BLADE FOR PLASTIC SHEET

(76) Inventor: Kunitsugu Suzuki, 2-231-2 Shinozakicho Edogawa-ku, Tokyo 133-0061 (JP)

( * ) Notice: Subject to any disclaimer, the term of this patent is extended or adjusted under 35 U.S.C. 154(b) by 153 days.

(21) Appl. No.: 09/645,935

(22) Filed: Aug. 25, 2000

(30) Foreign Application Priority Data

Aug. 27, 1999 (JP) .......................................... 11-242172

(51) Int. Cl.[7] .................................................. B32B 3/28
(52) U.S. Cl. ....................................... 428/167; 428/156
(58) Field of Search ................................ 428/167, 156, 428/192

(56) References Cited

U.S. PATENT DOCUMENTS 5,302,435 A * 4/1994 Hashimoto .................. 428/167
5,741,570 A * 4/1998 Seufert ....................... 428/167
6,391,424 B1 * 5/2002 Suzuki ....................... 428/167

* cited by examiner

*Primary Examiner*—Donald J. Loney
(74) *Attorney, Agent, or Firm*—Oblon, Spivak, McClelland, Maier & Neustadt, P.C.

(57) ABSTRACT

In a plastic sheet having a plurality of creasing lines, each creasing line is formed of a groove having a narrow bottom surface and a pair of opposed side surfaces each slanting at a certain angle; and a plurality of transverse grooves are disposed at a certain pitch in the longitudinal direction of the groove. Each transverse groove is formed by two or more curved projections to have at least one narrow bottom surface extending in a direction substantially perpendicular to the longitudinal direction of the groove.

2 Claims, 6 Drawing Sheets

PLASTIC SHEET HAVING CREASING LINES AND CREASING LINE-FORMING BLADE FOR PLASTIC SHEET

BACKGROUND OF THE INVENTION

1. Field of the Invention

The present Invention relates to a plastic sheet which has creasing lines, each formed of a groove having a bottom surface and a pair of opposed side surfaces each slanting at a certain angle, as well as to a creasing line-forming blade.

2. Description of the Related Art

When a packaging container or casing is formed through bending of a plastic sheet, a groove-like creasing line is press-formed at each portion of the plastic sheet at which the plastic sheet is to be bent. Subsequently, the plastic sheet is bent along the creasing lines in order to complete the packaging container or casing. U.S. Pat. No. 5,302,435 discloses such a technique. Conventional plastic sheets have employed creasing lines of various shapes and structures. The structure of such a creasing line greatly affects the performance of a completed plastic container or casing.

When a packaging container is to be formed through bending a plastic sheet, as shown in FIG. 1, grooves 2 are formed on a sheet 1 punched into a planar shape corresponding to the shape of the container, and the sheet 1 is then bent along the grooves 2 to thereby complete the container as shown in FIG. 2. The grooves 2 are called "lines for folding" or simply "creasing lines." The creasing lines are formed by a process such that a member called a "creasing line-forming blade" is pressed against the sheet 1.

The technique for bending a sheet after formation of creasing lines by use of creasing line-forming blade has conventionally been used for fabrication of paper containers. However, when this technique is applied to fabrication of plastic containers, fabrication of containers having corners of a desired angle is difficult, because a plastic sheet has higher resistance against bending and higher elasticity than does a paper sheet.

Various techniques for solving the above-described problems have been proposed. One solution is employment of creasing lines having a special shape to thereby facilitate bending operation. For example, Japanese Utility Model Publication (kokoku) No. 4-9345 discloses a plastic sheet having creasing lines each formed of a groove in which projections and depressions are formed alternately on the bottom surface along the longitudinal direction thereof. Japanese Patent Application Laid-Open (kokai) No. 64-40317 discloses a plastic sheet having creasing lines each formed of a groove in which holes are formed in the bottom portion at a predetermined pitch along the longitudinal direction thereof.

In relation to a method of bending a plastic sheet, Japanese Patent Application Laid-Open (kokai) No. 2-98422 discloses a method in which a plastic sheet having creasing lines is first folded at each of the creasing lines, then unfolded to the original state, and then subjected to a bending process.

Furthermore, a creasing line-forming blade having an improved structure has been proposed. Japanese Patent Application Laid-Open (kokai) No. 1-141720 (Japanese Patent No. 2541252) discloses a creasing line-forming blade for a plastic sheet whose tip end has depressed portions and projected portions arranged alternately along the longitudinal direction, wherein the depressed portion has a length of 0.3 to 2 mm, the projected portion has a length of 0.02 to 0.15 mm, the tip end of the projected portion has a width not greater than 0.5mm, and the tip angle is 30 to 130°.

FIG. 3 shows a perspective view of an example of such a creasing line-forming blade. Each projected portion 4 of a creasing line-forming blade 3 has a sharp point, and each depressed portion 5 of the creasing line-forming blade 3 has a flat shape. However, the projected portion 4 is not necessarily required to have the shape of a sharp cutting edge.

FIG. 4 shows a plastic sheet 6 on which creasing lines have been formed by use of the creasing line-forming blade 3. Upon the creasing line-forming blade 3 being pressed onto the plastic sheet 6, the plastic sheet 6 deforms, so that creasing lines 7 are formed. Almost no plastic material remains at each groove portion 8, but plastic material remains at each projection 9 formed by means of the depressed portion 5 of the creasing line-forming blade 3.

A recent automatic container fabrication machine can perform, at high speed, a series of operations for bending a sheet to complete a three-dimensional container, charging a liquid or the like into the container, and sealing the container. Although the above-described techniques have enabled fabrication of containers through bending of a plastic sheet having creasing lines, the conventional plastic sheet cannot completely cope with such an automatic container fabrication machine. Use of the conventional plastic sheet will raise problems such as breakage of a creasing line portion, and failure in formation of a three-dimensional shape.

In a plastic sheet having creasing lines, bending operation is facilitated through a decrease in the thickness (residual thickness) of the plastic sheet at the bottom of each groove serving as a creasing line. However, when the residual thickness is decreased, a strong force tends to act locally at creasing line portions during bending, especially during a step of forming a plastic sheet into a final shape by use of an automatic container fabrication machine, resulting in breakage of the container from a creasing line portion. This problem of breakage becomes remarkable when holes are provided at creasing line portions in order to facilitate a bending operation.

SUMMARY OF THE INVENTION

An object of the present invention is to provide a plastic sheet which has creasing lines of improved shape capable of preventing breakage of the creasing lines and which can cope with an automatic container fabrication machine which forms a packaging container from the plastic sheet.

The present invention provides a plastic sheet which has a plurality of creasing lines. Each creasing line comprises a main groove having a narrow bottom surface and a pair of opposed side surfaces each slanting at a certain angle; and a plurality of transverse grooves disposed at a certain pitch in the longitudinal direction of the main groove. Each transverse groove is formed by means of two or more curved projections to have at least one narrow bottom surface extending in a direction substantially perpendicular to the longitudinal direction of the main groove.

The present invention further provides a creasing line-forming blade for plastic sheet. The blade has a narrow tip and extending in the width direction and a pair of opposed side surfaces each continuing from the tip-end surface and slanting at a certain angle. At least two curved depressions are formed at the tip end such that the depressions are located adjacent to each other and extend perpendicular from the tip end. The boundary portion between the curved depressions forms a transverse blade portion.

Since a plastic sheet has high elasticity as compared with a paper sheet, when the plastic sheet is folded along creasing lines which are formed in the same manner as that used with a paper sheet, the plastic sheet restores its original shape due to its high elasticity. Therefore, if such a plastic sheet is formed into the shape of a container, the formed shape may deteriorate with passage of time. Therefore, a manner of forming creasing lines is an important factor in fabrication of containers which do not cause deformation. Furthermore, designing creasing lines in consideration of the material of a plastic sheet to be used is important.

In creasing lines of the present Invention, a plastic material left by means of the transverse blade portion and the curved depressions suppresses elasticity. In addition, a creasing line-forming blade which can cope with any material can be designed through determining the combination of the plurality of curved depressions and longitudinal blade portions.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

Figure 1:
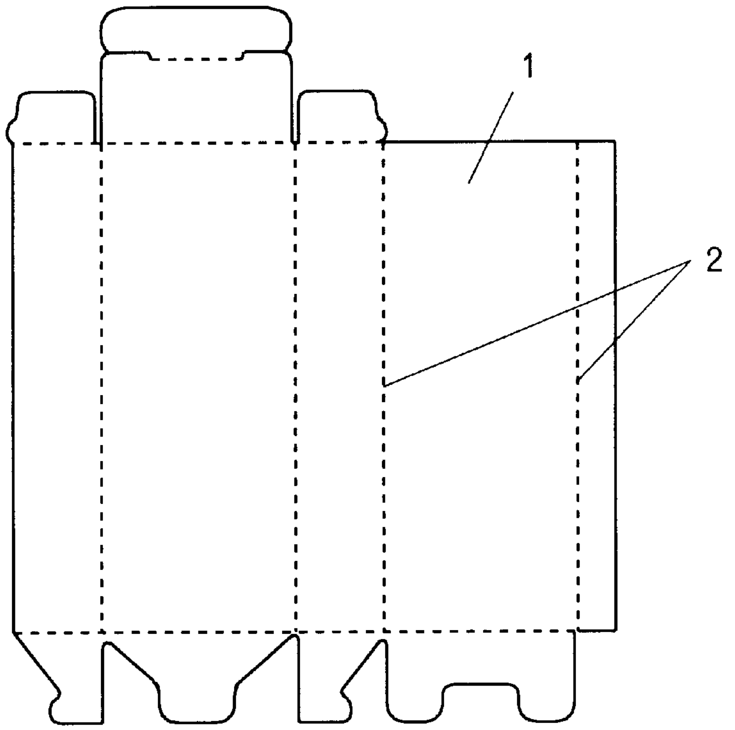
FIG. 1 is a plan view of a plastic sheet having creasing lines for a packaging container.
Figure 2:
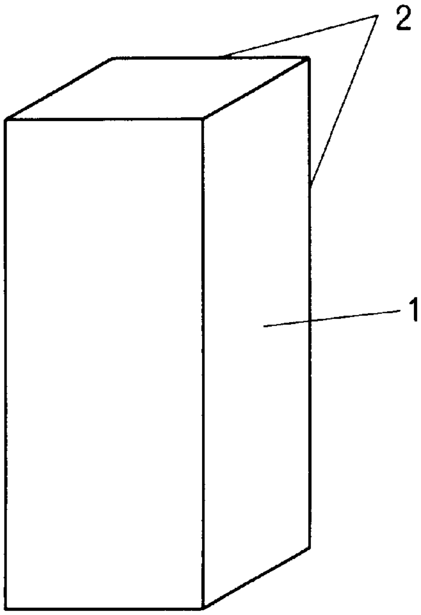
FIG. 2 is a perspective view of a container fabricated from the plastic sheet of FIG. 1.
Figure 3:
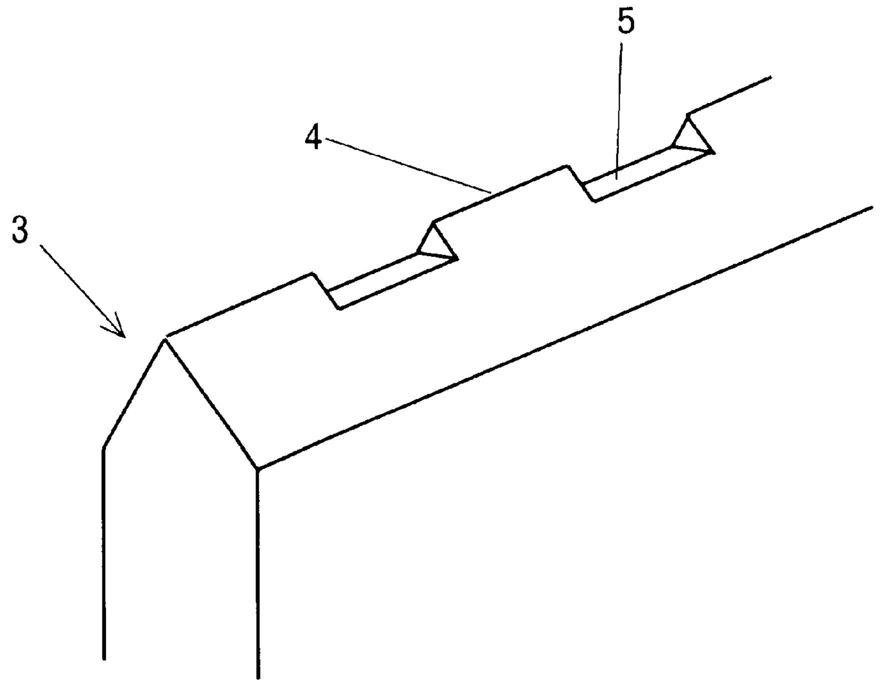
Fig.3 (PRIOR ART)
FIG. 3 is an explanatory view showing the structure of a conventional creasing line-forming blade.
Figure 4:
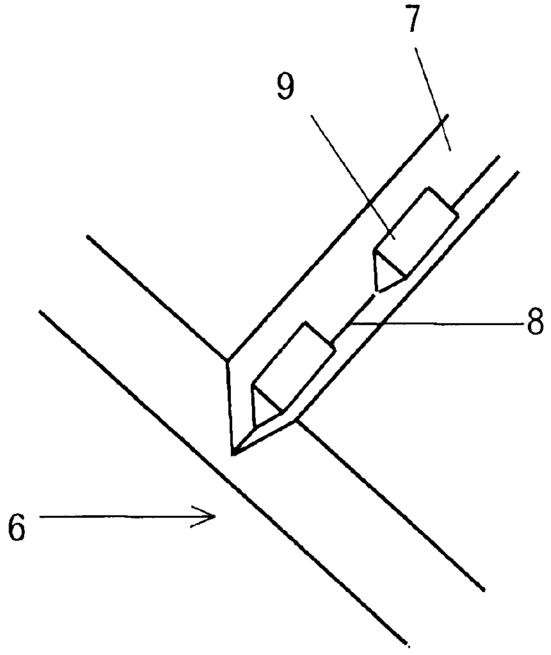
Fig.4 (PRIOR ART)
FIG. 4 is an explanatory view showing a creasing line which is formed on a plastic sheet by use of the conventional creasing line-forming blade shown in FIG. 3.
Figure 5:
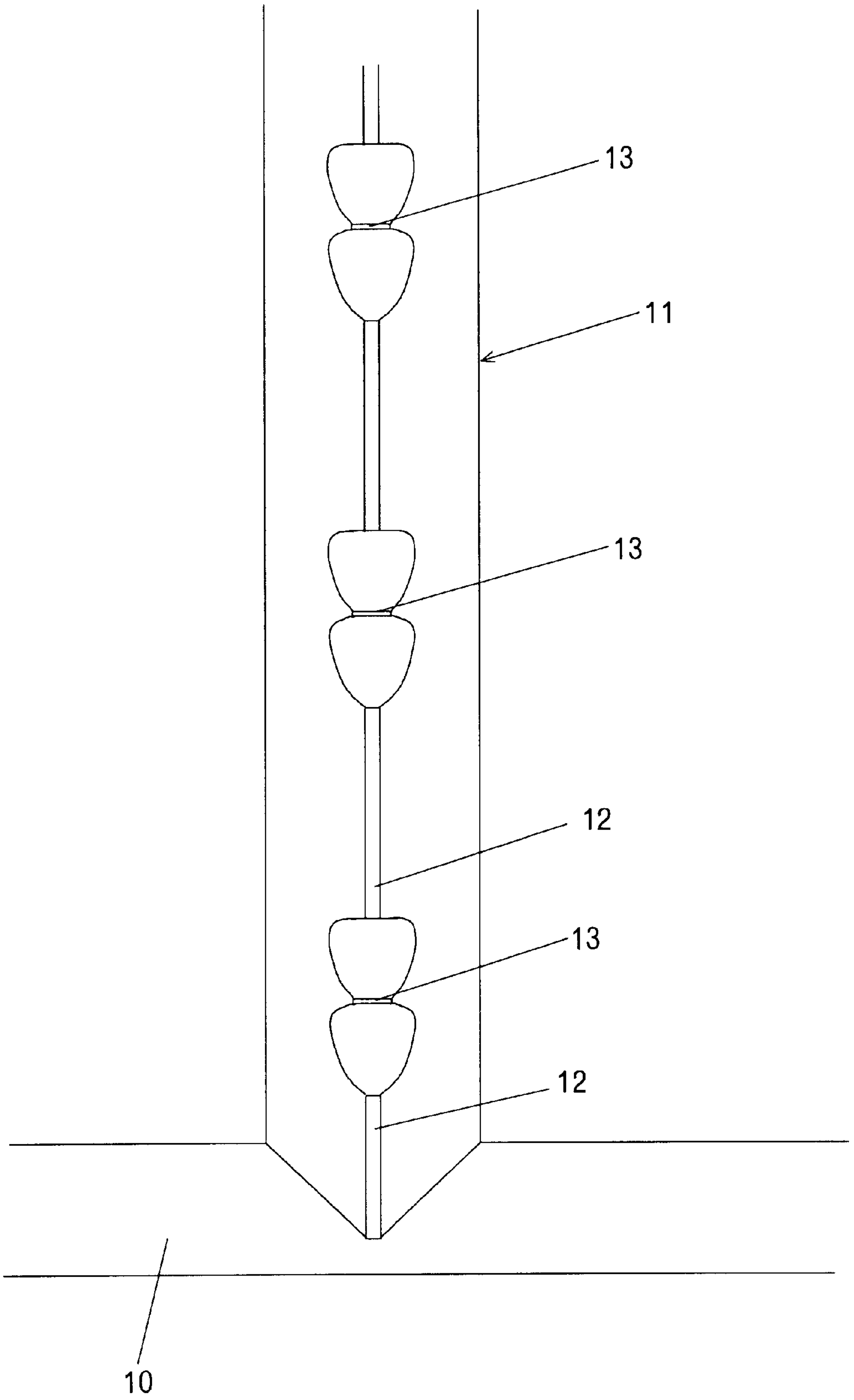
FIG. 5 is an overhead oblique view of a plastic sheet having creasing lines according to the present invention.

FIG. 5 is an overhead oblique view of a plastic sheet having creasing lines according to the present invention. As shown in FIG. 5, a creasing line (main groove) 11 is formed on a plastic sheet 10. A shallow, short transverse groove is formed at substantially equal intervals in the longitudinal direction of the creasing line 11. Each transverse groove has a narrow bottom surface 13 extending substantially perpendicular to the bottom surface 12 of the creasing line 11. The width of the bottom surface 13 is determined on the basis of the size and material of the plastic sheet and other factors.

The plastic sheet 10 is a single-layer sheet or a multi-layer sheet formed of polyethylene terephthalate, polyvinyl chloride. polypropylene, or any other suitable resin material and has a thickness of about 0.1 mm to about 1.0 mm. A creasing line-forming blade is a tool for forming creasing lines on a plastic sheet. The strength of portions at which creasing lines are formed can be changed on the basis of the material and thickness of the plastic sheet, through changing the combination of longitudinal blade portions, transverse blade portions, and curved depressions and through changing the depths of the transverse blade portions and the curved depressions.

Figure 6:
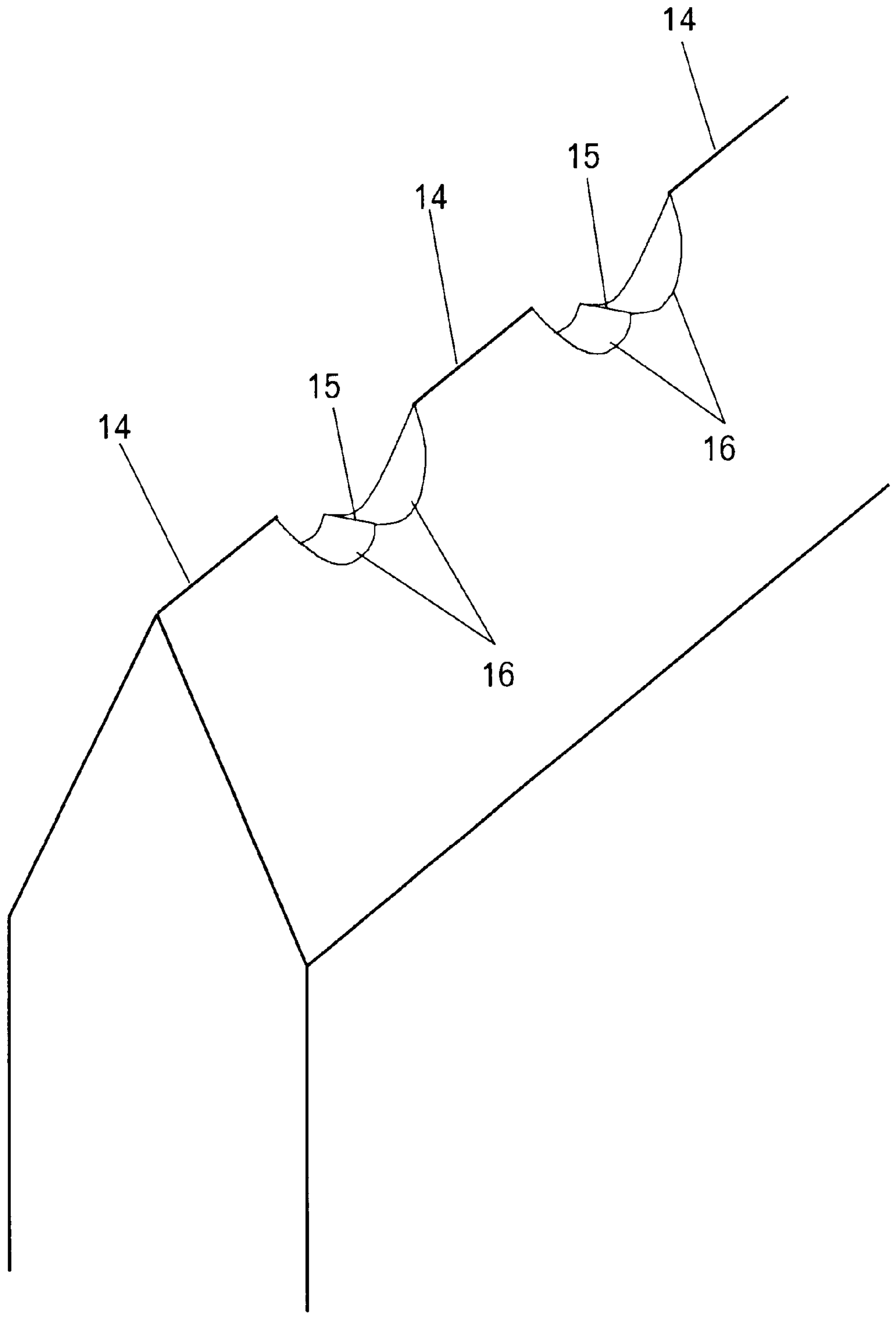
FIG. 6 is a perspective view of an embodiment of the creasing line-forming blade according to the present invention.

FIG. 6 is a perspective view of an embodiment of the creasing line-forming blade according to the present invention. In the creasing line-forming blade shown in FIG. 6, longitudinal blade portions 14, curved depressions 16, and transverse blade portions 15 are combined as illustrated. The longitudinal blade portions 14 each extend in the widthwise direction of the creasing line-forming blade, and the transverse blade portions 15 each extend in a direction substantially perpendicular to the widthwise direction of the creasing line-forming blade. Since the transverse blade portions 15 are present at deeper positions relative to the longitudinal blade portions 14, the transverse grooves formed by the transverse blade portions 15 each have a bottom wall thicker than that of the longitudinal groove formed by the longitudinal blade portions 14.

Figure 7:
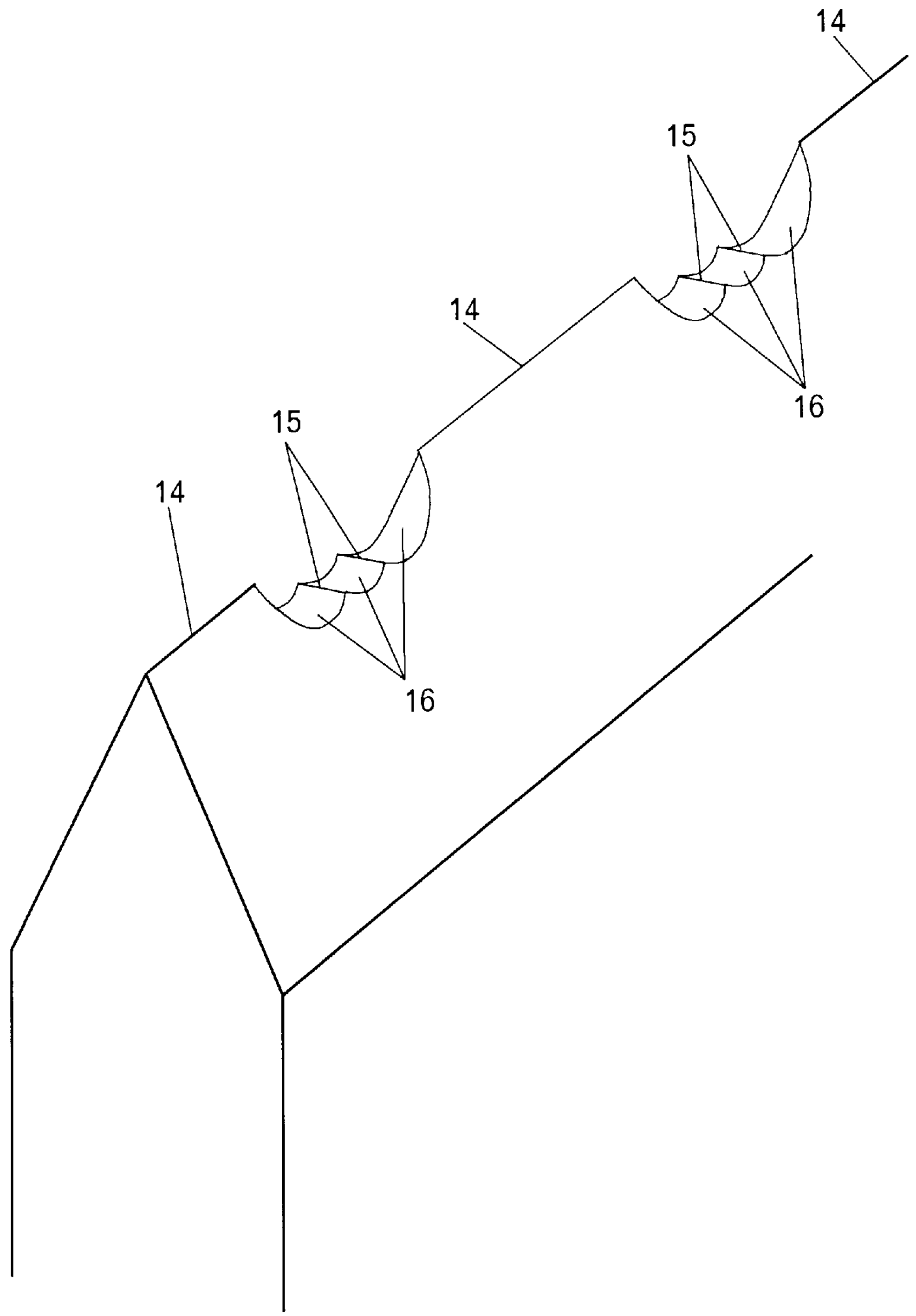
FIG. 7 is a perspective view of another embodiment of the creasing line-forming blade according to the present invention.

FIG. 7 is a perspective view of another embodiment of the creasing line-forming blade according to the present invention. In this embodiment, two transverse blade portions 15 are arranged successively. The number and positions of the transverse blade portions 15 are adjusted in accordance with the material and thickness of the plastic sheet.

Figure 8:
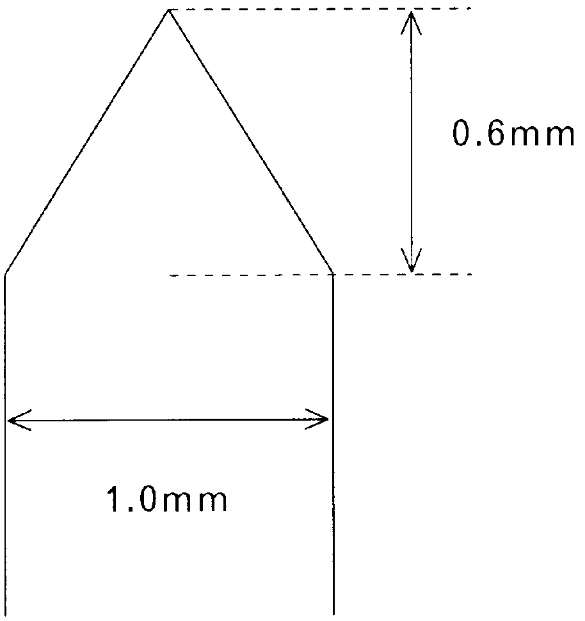
FIG. 8 is a sectional view of another embodiment of the creasing line-forming blade.
Figure 9:
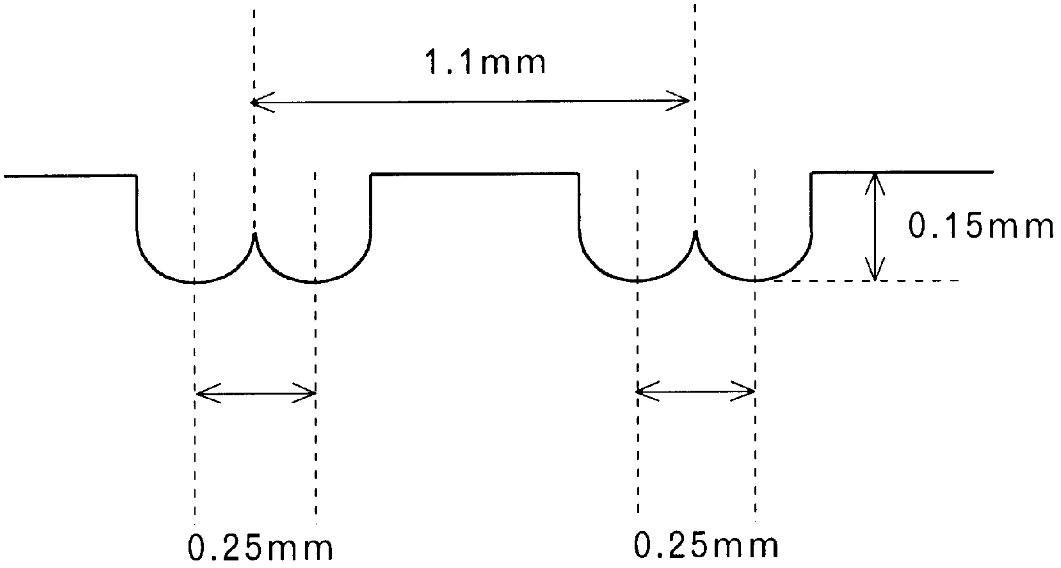
FIG. 9 is a side view of the creasing line-forming blade of FIG. 8.

An embodiment of the creasing line-forming blade shown In FIGS. 8 and 9 will be described. It is to be noted that these drawings do not reflect the actual dimensional relationship. As shown in FIG. 8, the creasing line-forming blade has a blade height of 0.6 mm and a blade thickness of 1.0 mm. FIG. 9 is a side view of the creasing line-forming blade. The pitch of transverse blade portions is 1.1 mm, and the distance between the deepest portions of the curved depressions is 0.25 mm.

The blade height, the pitch and the number of transverse blades, etc. can be changed in accordance with the material and.thickness of the plastic sheet. Accordingly, the present invention is not limited to the dimensions and configuration of this embodiment.

The present invention has following features:

i) A creasing line-forming blade suitable for a plastic material to be used can be designed with ease through changing the manner of forming the curved depressions.

ii) Since the longitudinal blade portions and the transverse blade portions are automatically formed through formation of the curved depressions, the creasing line-forming blade can be fabricated easily.

A plastic sheet has elasticity. Therefore, depending on a manner of forming creasing lines, the plastic sheet may restore its original shape due to the elasticity after being folded along creasing lines. Therefore, if such a plastic sheet Is formed into the shape of a container, the formed shape may deteriorate with passage of time. Therefore, a manner of forming creasing lines is an important factor in fabrication of containers which do not cause deformation. Furthermore, designing creasing lines in consideration of the material of a plastic sheet to be used is important. In creasing lines of the present invention, a plastic material left by means of the transverse blade portion and the curved depressions suppresses elasticity. In addition, a creasing line-forming blade which can cope with any material can be designed through determining the combination of the plurality of curved depressions and longitudinal blade portions.

The creasing line-forming blade of the present invention can be designed easily to be suited for each of various types of plastic sheet materials. In the plastic sheet having creasing lines according to the present invention, since the bottom portions of the creasing lines along which the plastic sheet is bent are not arranged simply along a straight line, partial breakage does not propagate to other portions. There was performed a test In which the plastic sheet according to the present invention was formed into a packaging container by use of an automatic container fabrication machine in which a relatively large folding force acted on the plastic sheet. The results of the test demonstrates that the ratio of generation of breakage decreases.

Since each curved depression has curved side walls, grooves formed in a plastic sheet and serving as creasing lines have a reduced number of sharp edges or corners, thus enabling production of a transparent container which mitigates light scattering, renders creases inconspicuous, and has excellent appearance.

Further, the complicated shape of the crease lines prevents restoration of creasing line portions to their original shapes, which would otherwise occur due to elasticity of the plastic sheet, so that the degree of deformation after a forming process can be decreased. In addition, the creasing line-forming blade can be adjusted over a widened range in accordance with a material to be used, through, for example, changing the number of transverse blade portions.

Obviously, numerous modifications and variations of the present invention are possible in light of the above teachings. It is therefore to be understood that within the scope of the appended claims, the present Invention may be practiced otherwise than as specifically described herein.

What is claimed is:

1. A plastic sheet having a plurality of creasing lines each comprising:

a main groove having a narrow bottom surface and a pair of opposed side surfaces each slanting at a certain angle; and a plurality of transverse grooves disposed at a certain pitch in the longitudinal direction in the main groove, each transverse groove being formed by two or more curved projections to have at least one narrow bottom surface extending in a direction substantially perpendicular to the longitudinal direction of the main groove.

2. A plastic sheet having a plurality of creasing lines each comprising:

main groove means having a narrow bottom surface and a pair of opposed side surfaces each slanting at a certain angle; and a plurality of transverse groove means disposed at a certain pitch in the longitudinal direction in the main groove, each transverse groove being formed by two or more curved projections to have at least one narrow bottom surface extending in a direction substantially perpendicular to the longitudinal direction of the main groove.

* * * * *